March 19, 1946.  L. F. HEMPHILL  2,396,950
ELECTRIC BRAKE
Filed Dec. 13, 1943
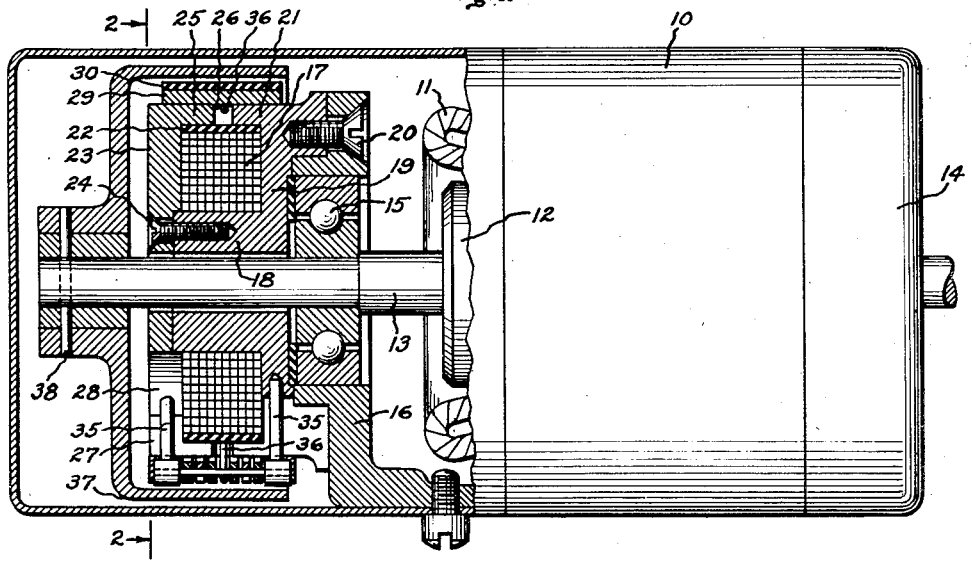
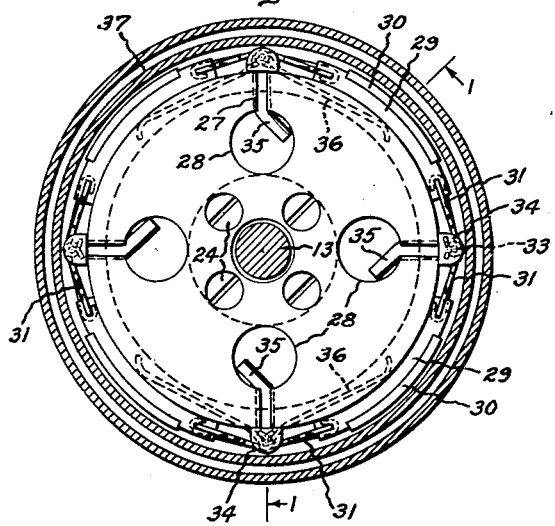
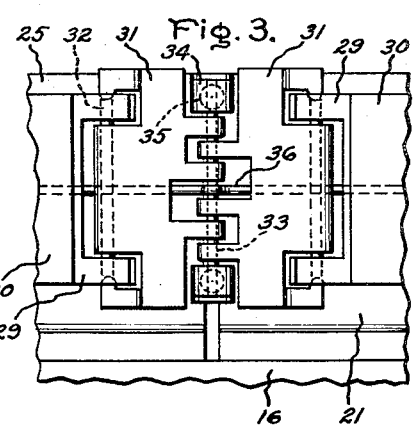
Inventor:
Lawrence F. Hemphill,
by Harry E. Dunham
His Attorney.

Patented Mar. 19, 1946

2,396,950

UNITED STATES PATENT OFFICE 2,396,950

ELECTRIC BRAKE

Lawrence F. Hemphill, Fort Wayne, Ind., assignor to General Electric Company, a corporation of New York Application December 13, 1943, Serial No. 514,057

2 Claims. (Cl. 188—171)

My invention pertains to electric brakes and particularly to the type utilizing magnetically operated brake shoes arranged to engage a brake drum to provide a frictional braking force thereon.

An object of my invention is to provide an improved electric brake.

Another object of my invention is to provide an improved electric brake wherein a plurality of brake shoes are adapted to be operated substantially independently of each other by a single electromagnet.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly in section, taken along line 1—1 of Fig. 2, of a dynamoelectric machine provided with an embodiment of my improved electric brake; Fig. 2 is a sectional view taken along line 2—2 of Fig. 1; and Fig. 3 is an enlarged plan view of the hinged support for the brake shoes shown in Figs. 1 and 2.

Referring to the drawing, I have shown my improved brake construction in connection with a dynamoelectric machine having a stationary member 10 provided with a winding 11 and a rotatable member 12 mounted on a shaft 13. The shaft 13 is supported at one end by any suitable bearing mounted in an end shield 14 and at the other end is supported by bearings 15 mounted in a supporting bracket 16 secured to the stationary member 10. The bracket 16 also forms a support for the stationary portion of the electromagnetic brake which includes an annular exciting winding 17 arranged about an annular hub 18 of a core of magnetic material which is provided with an outwardly extending flange portion 19 which is secured to the bracket 16 by a plurality of screws 20. An axially extending annular flange 21 is formed on the outer periphery of the core flange 19 and extends in the same direction as the hub 18 for about one-half the width of the exciting winding 17. An insulating element 22 is arranged about the outer periphery of the winding 17 and acts as a retainer to hold the coil in position on the core. A plate 23 of magnetic material is secured to the hub 18 by a plurality of screws 24 and is arranged in good magnetic contact with the outer end of the hub 18. An axially extending flange 25 is formed on the outer periphery of the plate 23 and extends over the adjacent outer periphery of the winding 17 and insulating element 22. The lengths of the flanges 21 and 25 are such as to provide an air gap 26 between the adjacent edges thereof which forms in effect a circumferentially extending groove which axially divides the outer periphery of the core. The magnetic core also is divided substantially radially by a plurality of divisions formed by slots 27 which extend from the outer periphery of the core into communication with holes 28. A plurality of brake shoes are mounted about the core and include arcuate elements 29 of magnetic material with friction surfaces 30 on the outer sides thereof. These brake shoes are supported by hinges in an outwardly movable relationship relative to the core. These hinges include mounting plates 31 provided with pivot pins 32 which secure the outer ends of the hinges to the magnetic brake shoe elements 29 and are provided with pintles 33 mounted in brackets 34 provided with securing pins 35 which extend into the slots 27 in the core. The inner ends of some of the pins 35 are bent over in the holes 28 in order to secure the mounting brackets firmly to the core. All parts of the hinge and its mounting bracket are made of non-magnetic material in order to prevent shunting the magnetic circuit through the hinge. These hinges are arranged so as to support the brake shoes between adjacent inwardly extending core divisions formed by the slots 27 and over the circumferentially divided core periphery. In this manner, each brake shoe magnetic element 29 extends over a separate pair of poles of the core formed between adjacent slots 27 at the air gap 26. The brake shoes are arranged to be biased outwardly by springs 36 and into engagement with a cup-shaped brake drum 37 which is secured to the rotatable member shaft 13 in any suitable manner, as by the pin 38. Each spring 36 engages a pair of adjacent brake shoes as shown in Fig. 2 and thereby substantially equalizes the braking force on these shoes. This brake drum extends over the shoes and the magnetic core member and is adapted to rotate freely about the stationary brake member during normal operation of the dynamoelectric machine. In order to provide this operation, the brake exciting winding 17 is adapted to be energized in response to energization of the motor winding 11, such that whenever the motor is energized, the brake exciting winding 17 also is energized and thereby excites the brake core elements and attracts the magnetic brake shoe elements 29 inwardly out of engagement with the brake drum 37 and into engagement with the flanges 21 and 25 to provide a magnetic shunt across the air gap 26. The arrangement of the separate brake shoes over the separate poles formed by the outwardly extending slots 27 insures operation of all of the brake shoes whenever the field exciting winding is energized, as the shunting of the magnetic flux through one brake shoe does not provide a magnetic shunt across the poles formed between the other segments of the magnetic core. This assures against the dragging of one or more of the brake shoes when one of the brake shoes has been attracted inwardly to close the air gap 26. This is an important feature of my improved construction, as it greatly increases the reliability of operation of the brake and minimizes the drag of these surfaces on the brake drum which might result from actuation of only some of the brake shoes on energization of the magnetic exciting winding 17. In this manner, all of the brake shoes are effectively drawn inwardly out of engagement with the brake drum for releasing the brake whenever the motor is energized and are substantially simultaneously actuated outwardly into engagement with the brake drum whenever the motor is deenergized.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An electric brake for a dynamoelectric machine having a rotatable member, an electromagnetic member formed with a core of magnetic material having divisions extending inwardly from the outer circumferential periphery thereof providing a plurality of circumferentially spaced apart poles, a groove extending circumferentially and inwardly from the outer circumferential periphery of said core for axially dividing the outer periphery thereof, brake shoes having elements of magnetic material, means including hinges of non-magnetic material secured to said core in said inwardly extending core divisions for supporting each of said brake shoes outwardly movable and with its magnetic material elements arranged between adjacent of said inwardly extending core divisions and over said circumferential core groove, a brake drum secured to said rotatable member and extending over said brake shoes, means including a spring arranged in engagement with a plurality of said brake shoes for biasing said brake shoes outwardly into engagement with said brake drum and substantially equalizing the braking force thereon, and means for exciting said core to draw said brake shoes inwardly out of engagement with said brake drum.

2. An electric brake for a dynamoelectric machine having a shaft, a stationary support for said shaft, a substantially annular electromagnetic member secured to said stationary support and formed with a core of magnetic material having divisions extending inwardly from the outer circumferential periphery thereof providing a plurality of circumferentially spaced apart poles, means including a groove extending circumferentially and inwardly from the outer circumferential periphery of said core for axially dividing the outer periphery thereof, brake shoes having inner arcuate elements of magnetic material with friction surfaces on the outer sides thereof, means including hinges secured to said core in said inwardly extending core divisions for supporting each of said brake shoes outwardly movable and with its magnetic material elements arranged between adjacent of said inwardly extending core divisions and over said circumferential core groove, a substantially cup-shaped brake drum mounted on said shaft and extending over said magnetic core member and brake shoes, means including a spring for biasing said brake shoes outwardly into engagement with said brake drum, and means including a field exciting winding arranged in said core groove for exciting said core and arranged to be energized in response to energization of said dynamoelectric machine to draw said brake shoes inwardly as a magnetic shunt across said circumferential groove and out of engagement with said brake drum for releasing said brake when said dynamoelectric machine is energized.

LAWRENCE F. HEMPHILL.